(12) United States Patent
Hirasawa et al.

(10) Patent No.: US 7,417,366 B2
(45) Date of Patent: Aug. 26, 2008

(54) DISPLAY DEVICE

(75) Inventors: Shigemi Hirasawa, Chiba (JP); Yuuichi Kijima, Chosei (JP); Hiroshi Kawasaki, Ooamishirasato (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 428 days.

(21) Appl. No.: 11/060,541

(22) Filed: Feb. 18, 2005

(65) Prior Publication Data

US 2005/0212401 A1   Sep. 29, 2005

(30) Foreign Application Priority Data

Feb. 20, 2004   (JP) .............................. 2004-045158

(51) Int. Cl.
 *H01J 31/00*   (2006.01)
(52) U.S. Cl. ..................... 313/495; 313/106; 313/352
(58) Field of Classification Search ................ None
 See application file for complete search history.

(56) References Cited

U.S. PATENT DOCUMENTS 5,451,835 A * 9/1995 Yamazaki et al. ........... 313/422
5,639,330 A   6/1997 Otake et al.
5,760,535 A   6/1998 Moyer et al.
7,064,493 B2 * 6/2006 Konishi .................... 315/169.1
2006/0091780 A1 * 5/2006 Minami ...................... 313/495

FOREIGN PATENT DOCUMENTS

| JP | 05-314932 | 11/1993 |
| JP | 7-141998 | 6/1995 |
| JP | 10-134701 | 5/1998 |
| JP | 10-321169 | 12/1998 |
| JP | 2000-306508 | 11/2000 |

* cited by examiner

*Primary Examiner*—Ashok Patel
(74) *Attorney, Agent, or Firm*—Antonelli, Terry, Stout & Kraus, LLP.

(57) ABSTRACT

The present invention provides an image display device in which it is possible to obtain an image display of high brightness and high contrast by preventing the halation which may be generated in a peripheral portion of a display image. By providing a carbon film which attenuates the reentry of secondary electrons, which are generated when electron beams impinge on an anodes, to a back surface of the anode, even when primary electrons impinge on the anode, the secondary electrons are hardly emitted from the anode. At the same time, a trace amount of emitted secondary electrons are mainly formed of electrons having a small energy. Hence, these emitted secondary electrons are scattered and hardly reenter the anode.

12 Claims, 5 Drawing Sheets

DISPLAY DEVICE

BACKGROUND OF THE INVENTION

The present invention relates in general to an image display device of the type which utilizes the emission of electrons in a vacuum which is created between a face substrate and a back substrate; and, more particularly, the invention relates to a secondary electron emission suppression structure which can reduce the reentry of secondary electrons that are generated when electron beams impinge on an anode.

As a display device which exhibits high brightness and high definition, color cathode ray tubes have been widely used conventionally. However, along with the recent demand for images of higher quality in information processing equipment or television broadcasting, the demand for planar displays (panel displays), which are light in weight and require a small space, while exhibiting high brightness and high definition, has been increasing.

As typical examples, liquid crystal display devices, plasma display devices and the like have been put into practice. More particularly, as display devices which can produce a higher brightness, various kinds of panel-type display devices, including a display device which utilizes an emission of electrons from electron sources into a vacuum (hereinafter referred to as "an electron emission type display device" or "a field emission type display device", and also as a "FED") and an organic EL display, which is characterized by low power consumption, have been commercialized.

Among such panel type display devices, such as the above-mentioned field emission type display device, particularly, a display device having an electron emission structure, which was invented by C. A. Spindt et al, a display device having an electron emission structure of a metal-insulator-metal (MIM) type, a display device having an electron emission structure which utilizes an electron emission phenomenon based on a quantum theory tunneling effect (also referred to as a "surface conduction type electron source"), and a display device which utilizes an electron emission phenomenon having a diamond film, a graphite film or carbon nanotubes have been known.

The field emission type image display device includes a back substrate, on which cathode lines are formed which have field-emission-type electron sources and control electrodes on an inner surface thereof, and a face substrate, on which anodes and phosphors are formed on an inner surface thereof which faces the back substrate in an opposed manner. These substrates are laminated to each other with a sealing frame interposed between the inner peripheries thereof, and the inside defined by both substrates and the sealing frame is evacuated to create a vacuum therein. The above-mentioned control electrodes are arranged to cross the cathode lines by way of an insulation layer or an insulation gap.

Further, in the above-mentioned control electrodes, a single hole or a plurality of holes, which allow electrons emitted from the electron sources formed on the cathode lines to pass therethrough, are formed for every pixel. Further, for maintaining a given distance between the back substrate and the face substrate, distance holding members may be provided between the back substrate and the face substrate. The distance holding members for maintaining a given distance between the back substrate and the face substrate are, for example, formed of a thin plate made of glass or ceramics and are arranged in an erect manner at positions which avoid the pixels.

FIG. 7 is an enlarged cross-sectional view of the vicinity of one pixel for illustrating the basic structure of an FED. In FIG. 7, the FED includes a back panel PN1, on which cathode lines CL are formed having cathodes K position thereon which constitute field-emission-type electron sources and on which control electrodes G are formed on an inner surface of a back substrate SUB1, and a face panel PN2, on which phosphors PHS, a black matrix BM and an anode ADE are formed on an inner surface of a face substrate SUB2, which faces the back panel PN1 in an opposed manner and which has a light transmitting property. The back panel PN1 and the face panel PN2 are laminated to each other with a sealing frame interposed between the inner peripheries of both of the panels PN1, PN2, thus forming a vacuum vessel (envelope), the inside of the vacuum vessel being evacuated to create a vacuum therein. Here, with respect to this type of technology, for example, examples of such display devices are described in Japanese Laid-open Patent Publication Hei10(1998)-134701 and Japanese Laid-open Patent Publication 2000-306508.

In an FED having such a constitution, the control electrodes G, which form electron passing holes EHL, are arranged between the cathodes K, formed on the cathode lines CL provided on the back substrate SUB1, and the anode ADE formed on the face substrate SUB2. By applying given potential difference between the control electrodes G and the cathode lines CL, electrons E are induced from the cathodes K, and the electrons E are allowed to pass through the electron passing holes EHL formed in the control electrodes G and to impinge on the phosphors PHS formed on the anode ADE, thus enabling an image display.

Further, the FED having such a constitution is configured such that the face-to-face distance between the anode ADE and the cathode lines CL is set to approximately several mm. Here, the FED is driven by applying a high voltage, which constitutes an anode voltage Eb ($Eb=13\pm3$ kV), to the anode ADE to allow the phosphors PHS to efficiently emit light, by applying a voltage which constitutes a control voltage Eg ($Eg=1$ kV or below 1 kV) to the control electrodes G, and by applying a cathode voltage Ek ($Ek=$several 100V) to the cathodes K.

Accordingly, in the FED, the anode voltage Eb is extremely high compared to the respective electrode voltages, and, hence, a steep potential gradient is formed between these voltages. Accordingly, as shown in FIG. 8, secondary electrons e2, including reflecting electrons, which are generated when primary electrons e1 which form the electron beams impinge on the anode ADE and reenter the anode ADE due to an electric field, excite the neighboring phosphors and cause the phosphors to emit light. Accordingly, in a peripheral portion of the display image which actually emits light, halation attributed to the reentry of the secondary electrons e2 is generated and this phenomenon has been the main cause of the lowering of the contrast.

As a means to overcome such a drawback, there is an image display device in which an aluminum layer is formed over the phosphors PHS, which are formed on the anode ADE in a state in which the film thickness of the aluminum layer is adjusted so as to suppress the reentry efficiency of the secondary electrons into the aluminum layer to 30% or less. Accordingly, the halation can be reduced within a range in which the brightness is slightly lowered, whereby the contrast is enhanced. Here, with respect to this type of technology, Japanese Laid-open Patent Publication Hei5(1993)-314932 can be cited as an example.

Further, as another means to overcome such a drawback, there is a field emission type display device in which a first conductive layer (an aluminum layer), which constitutes a light reflection layer, and a second conductive layer (a carbon layer), which controls the scattering of the primary electrons, are sequentially formed over the phosphors which are is formed on the anode ADE; and, hence, these layers can simultaneously function as a metal back layer and provide a scattering suppressing function, whereby the contrast and the color purity can be enhanced. Here, with respect to this type of technology, Japanese Laid-open Patent Publication Hei10 (1998)-321169 can be cited as an example.

SUMMARY OF THE INVENTION

With respect to the display device described in Japanese Laid-open Patent Publication Hei5(1993)-314932, by adjusting the thickness of the aluminum layer, among the secondary electrons which are generated from the aluminum layer, the electrons which reenter the phosphors through the aluminum layer again are suppressed to 30% or less, thus reducing the halation, while restricting the lowering of the brightness within the necessary minimum. However, the display device cannot surely prevent the halation which is generated in a peripheral portion of the display image at the time of emitting light with high brightness.

Further, with respect to the display device described in Japanese Laid-open Patent Publication Hei10(1998)-321169, by sequentially forming the aluminum layer and the carbon layer, the stacked layer can simultaneously perform the function of the metal back layer and the function of suppressing the diffusion of the primary electrons. However, the display device cannot surely prevent the halation which is generated in a peripheral portion of the display image at the time of emitting light with high brightness.

Accordingly, the present invention has been made to overcome the above-mentioned drawbacks, and it is an object of the present invention to provide an image display device which can prevent the halation which is generated on a peripheral portion of an image display at the time of emitting light with high brightness, thus providing an image display of both high brightness and high contrast.

The drawbacks described above can be overcome by an image display device having the following constitution. That is, the image display device includes a face substrate which has phosphors, a black matrix and an anode on an inner surface thereof, a back substrate which has a plurality of electron sources on an inner surface thereof and is arranged to face the face substrate in an opposed manner with a given distance therebetween, and a frame body which is interposed between the face substrate and the back substrate in a state wherein the frame body surrounds a display region and maintains the given distance, wherein a secondary electron suppressing film which attenuates the reentry of secondary electrons which are generated when electron beams impinge on the anode is formed on a back surface of the anode. Accordingly, the emission of the secondary electrons from the anode, which can be attributed to the impingement of primary electrons, will hardly occur, and, at the same time, a trace amount of emitted secondary electrons are mainly formed of electrons having small energies, and, hence, the secondary electrons are scattered, so that the electrons hardly reenter the anode even when an electric field is applied again.

Further, the drawbacks described above also can be overcome by an image device having the following constitution. That is, the image display device includes a face substrate which has phosphors, a black matrix and an anode on an inner surface thereof, a back substrate which includes a plurality of electron sources on an inner surface thereof and is arranged to face the face substrate with a given distance therebetween, a frame body which is interposed between the face substrate and the back substrate in a state wherein the frame body surrounds a display region and maintains the given distance between the face substrate and the back substrate, and distance holding members which are provided in an erect manner and are sandwiched between the face substrate and the back substrate, thus maintaining the given distance between the face substrate and the back substrate, wherein a secondary electron suppressing film which reduces the reentry of secondary electrons which are generated when electron beams impinge on the anode is formed at positions which are arranged above a back surface of the anode and avoids the distance holding members. Accordingly, the emission of secondary electrons from the anode, which can be attributed to the impingement of primary electrons, will hardly occur, and, at the same time, a trace amount of emitted secondary electrons are mainly formed of electrons having small energies, and, hence, the secondary electrons are scattered, so that the electrons hardly reenter the anode even when an electric field is applied again.

Further, by forming the secondary electron suppressing film as a discontinuous film (an island shape), the emission of the secondary electrons from the anode, which can be attributed to the impingement of the primary electrons, becomes difficult, and, at the same time, a trace amount of emitted secondary electrons are scattered, and, hence, the secondary electrons hardly reenter the anode, whereby it is possible to overcome the drawback described above.

Further, by forming the secondary electron suppressing film using a carbon film having at least one layer, the emission of the secondary electrons from the anode, which can be attributed to the impingement of the primary electrons, becomes difficult, and, at the same time, a trace amount of emitted secondary electrons are scattered, and, hence, the secondary electrons hardly reenter the anode, whereby it is possible to overcome the drawback described above.

Further, by forming the secondary electron suppressing film using a stacked film constituted of a carbon film and a graphite film, the emission of the secondary electrons from the anode, which can be attributed to the impingement of the primary electrons, becomes difficult, and, at the same time, a trace amount of emitted secondary electrons are scattered, and, hence, the secondary electrons hardly reenter the anode, whereby it is possible to overcome the drawback described above.

Further, by forming the secondary electron suppressing film using a boron film having at least one layer, the emission of the secondary electrons from the anode, which can be attributed to the impingement of the primary electrons, becomes difficult, and, at the same time, a trace amount of emitted secondary electrons are scattered, and, hence, the secondary electrons hardly reenter the anode, whereby it is possible to overcome the drawback described above.

Further, by forming the secondary electron suppressing film using a stacked film constituted of a boron film and a graphite film, the emission of the secondary electrons from the anode, which can be attributed to the impingement of the primary electrons becomes difficult, and, at the same time, a trace amount of emitted secondary electrons are scattered, and, hence, the secondary electrons hardly reenter the anode, whereby it is possible to overcome the drawback described above.

The invention is not limited to the above-mentioned respective constitutions and the constitutions of embodiments to be described hereinafter, and it is needless to say that various modifications are conceivable without departing from the technical concept of the present invention.

According to the present invention, by providing a secondary electron suppressing film which prevents the reentry of the secondary electrons, which are generated when the electron beams are incident on the anode, on the back surface of the anode, even when the primary electrons impinge on the anode, the secondary electrons containing reflecting electrons are hardly emitted from the anode. Further, the trace amount of emitted secondary electrons are scattered, and these secondary electrons hardly reenter the anode due to an electric field, and, hence, halation hardly is generated in a peripheral portion of a bright display image. At the same time, the occurrence of a defocusing state in which the whole screen is blurred is reduced, whereby it is possible to achieve an excellent advantageous effect in that an image display of both high brightness and high contrast can be obtained.

DESCRIPTION OF THE PREFERRED EMBODIMENTS

Hereinafter, specific embodiments of the invention will be explained in detail in conjunction with the drawings.

Embodiment 1

Figure 1:
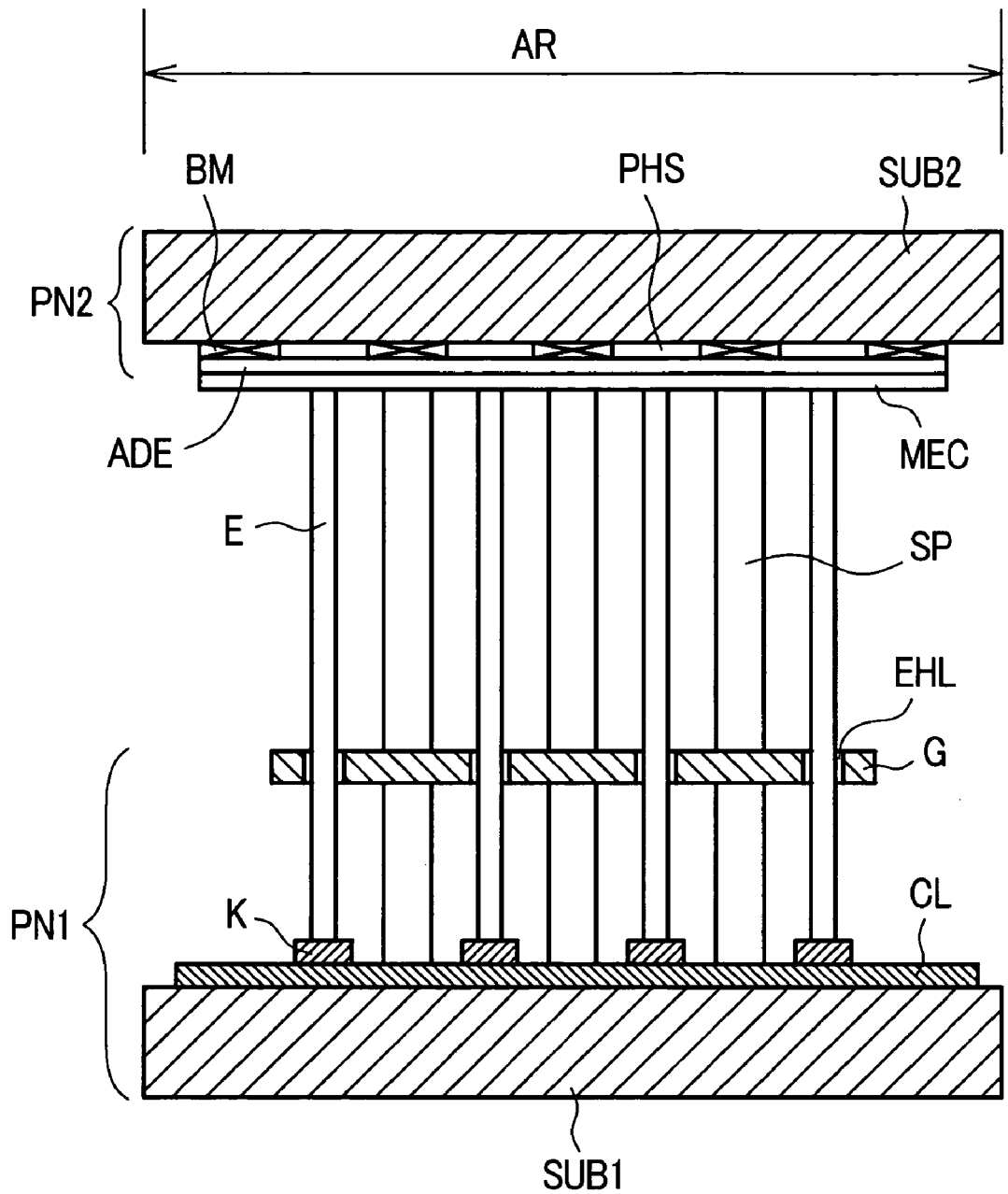
FIG. 1 is a cross-sectional view illustrating the constitution of one embodiment of an image display device according to the present invention.

FIG. 1 is a cross-sectional view of a representative part of a FED according to one embodiment of an image display device of the present invention. In FIG. 1, symbol SUB1 indicates a back substrate which is formed of an insulation material, preferably a glass plate, and it constitutes a back panel PN1. On an inner surface of the back substrate SUB1, there are a plurality of cathode lines CL, which extend in one direction y (the vertical direction) and are arranged in parallel in another direction x (the horizontal direction), and they include cathodes K as electron sources.

Further, over the back panel PN1, control electrodes G, which cross the cathode lines CL in a non-contact state, extend in the x direction and are arranged in parallel in the y direction, and they are arranged to face the back panel PN1 in a non-contact state. Here, the control electrodes G form pixels at crossing portions of the control electrodes G and the cathode lines CL, and a plurality of electron passing holes EHL are provided, which allow electrons E emitted from the cathodes K to pass therethrough to the face panel PN2 side.

The cathode lines CL are formed by patterning a conductive paste containing silver or the like by printing or the like and, thereafter, by baking the conductive paste. Further, in forming the cathodes K, which are arranged on upper surfaces (face substrate SUB2 side) of crossing portions of these cathode lines CL and the control electrodes G, for example, CNT (carbon nanotubes) is used. As an example, Ag-B-CNT paste is patterned by printing or the like, and, thereafter, the paste is baked to form the cathodes K.

Further, the control electrodes G have the structure in which a electron passing holes EHL, having a circular shape, are formed as a thin plate made of a conductive metal plate material, such as nickel, for example, by an etching forming method using a photolithography method for every pixel, and, thereafter, the control electrodes G are fixed outside a display region AR of the back panel PN1.

On the other hand, the face panel PN2 is laminated to the back panel PN1 with a given distance therebetween using a frame (body not shown in the drawing) which extends in the z direction. The face panel PN2 is formed such that, on an inner surface of the face substrate SUB2, which is formed as a light transmitting insulation substrate such as a glass plate or the like, and has a plate thickness of approximately 2.8 mm, phosphors PHS, which are defined by a black matrix BM, are formed. Further, on back surfaces of the black matrix BM and the phosphors PHS, an anode ADE formed of a vapor deposition film made of an aluminum material, for example, is formed.

Figure 2:
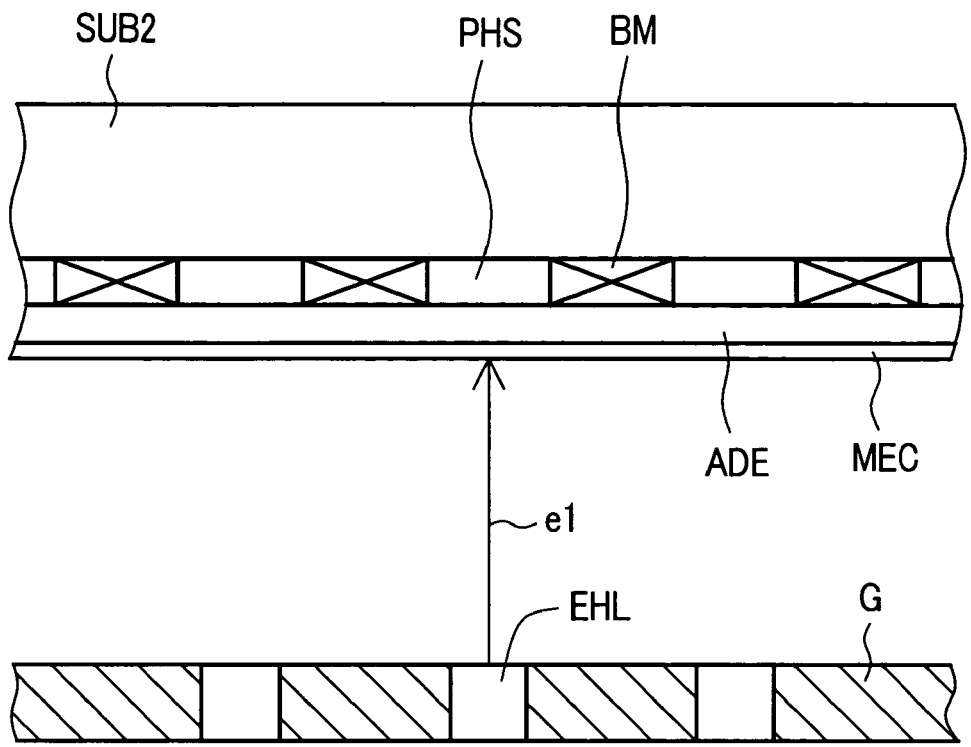
FIG. 2 is an enlarged cross-sectional view of a representative part showing the constitution of a face substrate of the image display device shown in FIG. 1.

Further, to a back-side whole surface of the anode ADE, which is formed on an inner surface of the face substrate SUB2 and faces the control electrodes G, for example, a carbon material having a small secondary electron emission ratio is applied as a secondary electron suppressing film using a sputtering method or the like, thus forming a carbon film MEC, as shown in FIG. 2. Here, the formation of the carbon film MEC is not limited to a sputtering method, and the carbon film may be formed with a film thickness of approximately 500 angstrom to approximately 2500 angstrom using a resistance vapor deposition method or an electron beam vapor deposition method.

Further, between the back panel PN1 and the face panel PN2, distance holding members SP, which maintains a given distance between both substrates, are mounted in an erect manner and are sandwiched between the face substrate SUB2 and the back substrate SUB1. The face substrate SUB2 and the back substrate SUB1 are laminated to each other, while interposing a sealing film (not shown in the drawing) is interposed between the inner peripheries of both substrates, thus forming a vacuum envelope, and a vacuum state is created in the inside of the vacuum envelope.

In such a constitution, by covering the back surface of the anode ADE with the carbon film MEC, which constitutes a secondary electron suppressing film, even when the anode voltage Eb, which is a high voltage of approximately 13±3 kV, is applied to the anode ADE and a steep potential gradient is set, such that a large electric current is supplied, the emission of the secondary electrons e2, which contain the reflection electrons from the anode ADE attributed to the impingement of the primary electrons e1, hardly occurs. Further, since a trace amount of emitted secondary electrons e2 is mainly formed of electrons having a small energy, the secondary electrons e2 are scattered and hardly reenter the anode ADE due to an electric field again, whereby the light emission of the phosphors PHS attributed to the reentry of the secondary electrons e2 can be suppressed. Accordingly, halation is hardly generated in the peripheral portion of the bright display image, and, at the same time, the occurrence of a defocusing state in which the whole screen is blurred can be reduced, whereby it is possible to obtain an image display of high brightness and high contrast.

Further, in such a constitution, using the carbon film MEC as a secondary electron suppressing film, it is possible to alleviate thermal damage in the heat treatment step which is performed at a temperature of approximately 440° C. for 30 minutes in the manufacture of the FED, whereby the yield rate and the reliability can be largely enhanced.

Here, the film thickness of the carbon film MEC is set to a value which falls within a range of approximately 500 angstrom to approximately 2500 angstrom. This is because, when the film thickness is below 500 angstrom, the secondary electrons e2 are liable to easily pass through the anode ADE, and hence, a sufficient secondary electron suppressing effect cannot be obtained. On the other hand, when the film thickness exceeds 2500 angstrom, the energy loss of the electron beams becomes large, and the transmissivity of the electron beams becomes approximately 90% or below, so that the electrons hardly reach the phosphors PHS, with the result that a sufficient light emitting brightness cannot be obtained. Accordingly, it is preferable to set the film thickness of the carbon film MEC to a value which falls within a range of approximately 500 angstrom to approximately 2500 angstrom.

Figure 3:
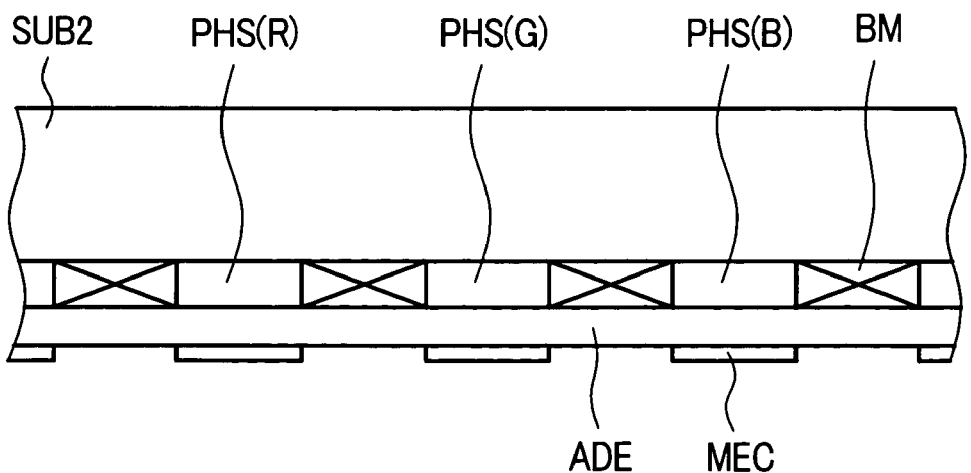
FIG. 3 is an enlarged cross-sectional view of a representative part of a face panel showing the constitution of another embodiment of the image display device according to the present invention.

Here, an explanation has been made with respect to a case in which the carbon film MEC is formed on the back surface of the anode ADE as a single layer made of carbon material. However, even when the carbon film MEC is formed as a multilayered structure in which carbon materials are stacked in plural layers, substantially the same advantageous effects can be obtained. Further, although the carbon film MEC is continuously formed on the whole surface of the back surface of the anode ADE, even when the carbon film MEC is formed discontinuously (in an island shape) on portions corresponding to the phosphors of respective colors PHS(PHS(R), PHS (G), PHS(B)), as shown in FIG. 3, it is possible to obtain exactly the same advantageous effects. In this case, the carbon film MEC, which is formed in an island shape, can be easily formed by a method in which fine carbon powder (having a particle size of 10 μm to approximately 30 μm) is dispersed in a binder, the mixture is formed in a slurry form, and the mixture is applied by spraying by way of a mask.

Embodiment 2

Figure 4:
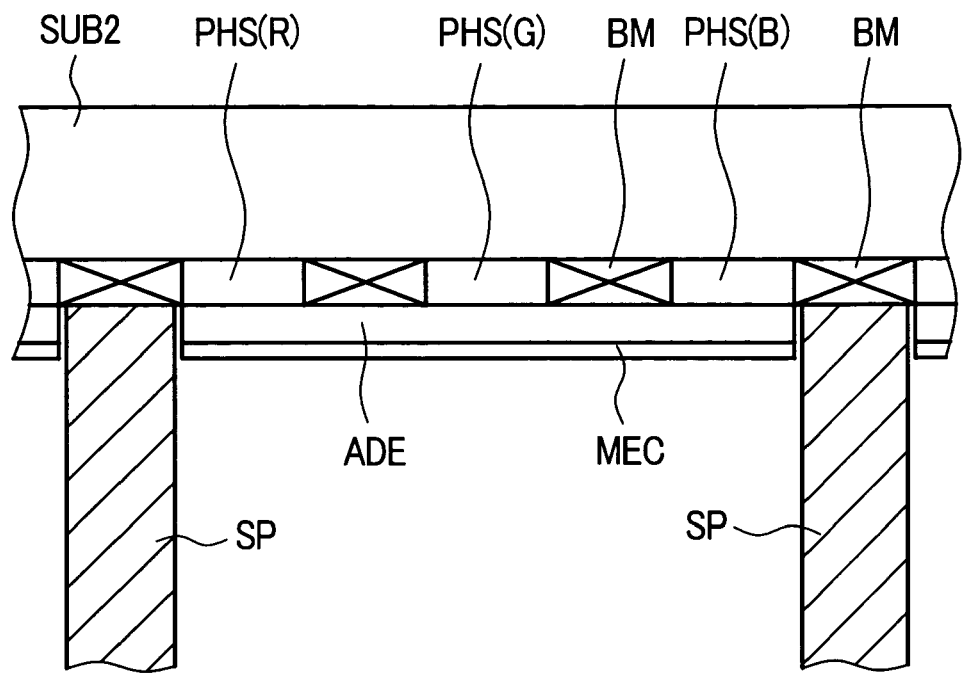
FIG. 4 is an enlarged cross-sectional view of a representative part of a face substrate, which shows the constitution of still another embodiment of the image display device according to the present invention.

FIG. 4 is an enlarged cross-sectional view of an FED representing another embodiment of the image display device according to the present invention. In the FED shown in FIG. 4, as well as in FIG. 1, between the face substrate SUB2 and the back substrate SUB1, distance holding members SP, which maintain a given distance between the face substrate SUB2 and the back substrate SUB1, are provided. These distance holding members SP are formed of a thin plate made of glass or ceramics, for example, and they are arranged in an erect manner at positions which avoid the pixels, for example, on the black matrix BM.

In this embodiment, as shown in FIG. 4, the carbon film MEC, which constitutes a secondary electron suppressing film formed on the back surface of the anode ADE, is formed in regions which avoid the distance holding members SP. Also, in this case, the carbon film MEC can be easily formed by a method in which fine carbon powder is dispersed in a binder, and the mixture is formed in a slurry form and is applied by spraying, while masking the regions where the distance holding members SP are arranged. It is also possible to obtain exactly the same advantageous effects as the above-mentioned advantageous effects with such a constitution.

Figure 5:
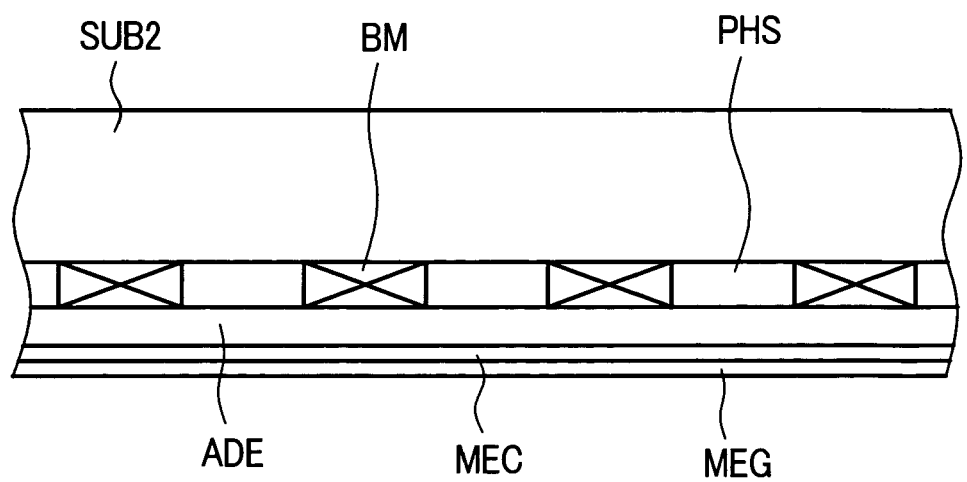
FIG. 5 is an enlarged cross-sectional view of a representative part of a face substrate, which shows the constitution of another embodiment of the image display device according to the present invention.

In the above-mentioned embodiment, an explanation was given with respect to a case in which the secondary electron suppressing film is formed of a carbon film MEC of a single layer. However, as shown in FIG. 5, the secondary electron suppressing film may be formed to have a two-layered structure in which a graphite film MEG is formed on an upper surface of the carbon film MEC. Also, in this case, as a method of forming the carbon film MEC and the graphite film MEG, any one of the above-mentioned various forming methods may be used. That is, the film forming method is not particularly limited to a given method.

Further, as another embodiment of the secondary electron suppressing film, the secondary electron suppressing film may be formed of a graphite film MEG of a single layer in place of the above-mentioned carbon film MEC. The graphite film MEG may be formed by a method in which fine graphite powder is dispersed in a binder, the mixture is formed in a slurry shape and is applied by spraying by way of a mask. In this case, the material cost and the manufacturing cost becomes less, and, hence, it is possible to manufacture the secondary electron suppressing film at a low cost.

Also, with such a constitution, it is possible to obtain exactly the same advantageous effects as the above-mentioned advantageous effects. Further, by forming the graphite film MEG on a topmost surface of the back surface of the anode ADE, it is possible to reduce thermal damage which occurs in the heat treatment step, which is performed at a temperature of 440° C. for 30 minutes in the manufacture of the FED, and, hence, the stability is enhanced, whereby the yield rate and the reliability are further enhanced.

As still another embodiment of the secondary electron suppressing film, in place of the above-mentioned carbon film or graphite film, it may be possible to form a boron film, which is made of boron having a smaller atomic number than aluminum and exhibits a higher stability. Further, a carbon film may be formed on a surface of this boron film, thus forming a two-layered structure. Further, a boron oxide film may be used in place of the boron film. Here, also in this case, as a method of forming the boron film, boron oxide film and carbon film, any one of the above-mentioned various forming methods may be used. That is, the film forming method is not particularly limited to a given method.

Also, with such a constitution, it is possible to obtain exactly the same advantageous effects as the above-mentioned advantageous effects. Further, when a boron film is used, although the boron material is slightly higher than the above-mentioned graphite material with respect to the material cost, it is possible to reduce the manufacturing cost of the boron film by adopting a means which disperses the fine boron powder in binder, forms the mixture in a slurry form and applies the mixture by spraying. Accordingly, it is possible to absorb the expensive property of the material cost, thus realizing a manufacture of the boron film at a low cost in total.

Figure 6:
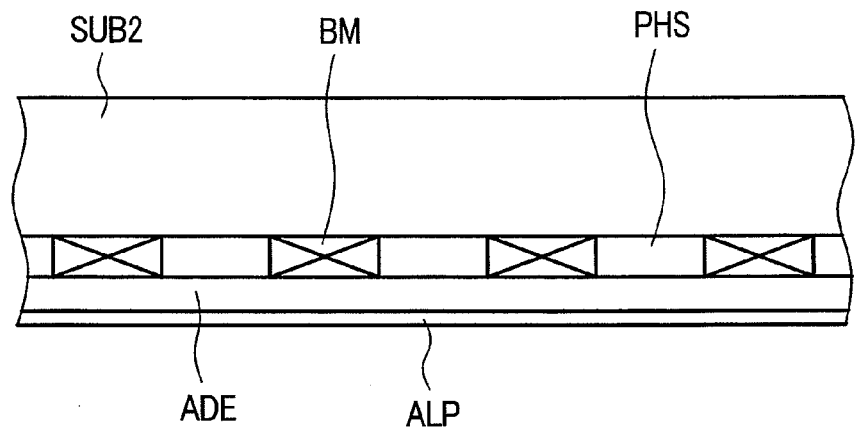
FIG. 6 is an enlarged cross-sectional view of a representative part of a face substrate, which shows the constitution of another embodiment of the image display device according to the present invention.
Figure 7:
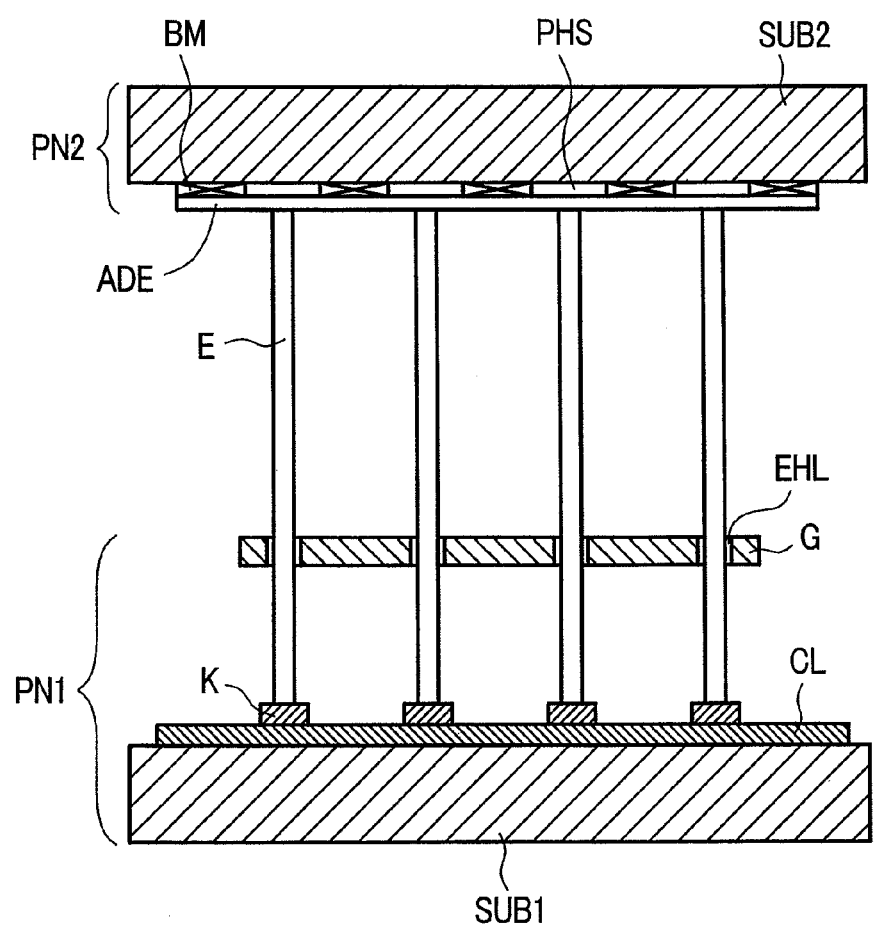
FIG. 7 is a cross-sectional view of a representative part showing the basic structure of an image display device.
Figure 8:
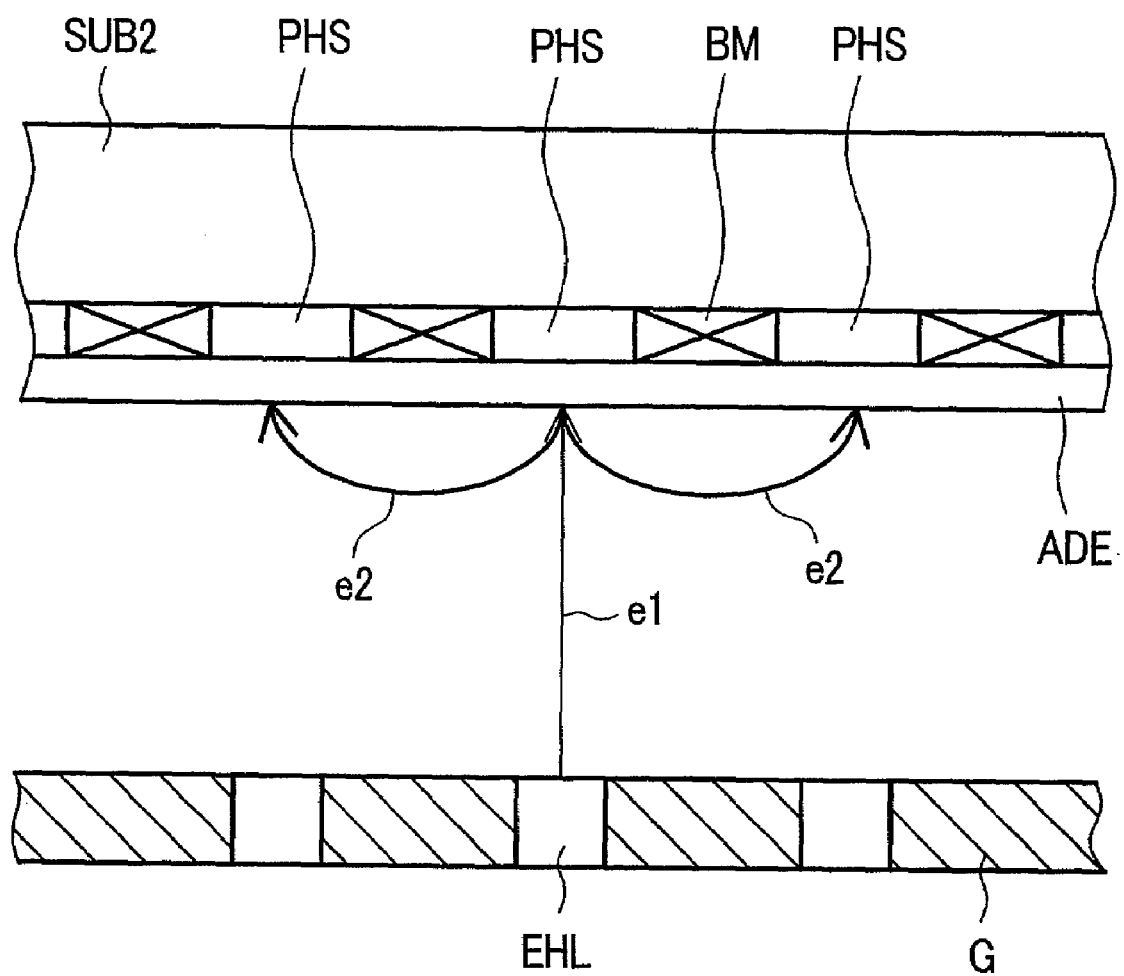
FIG. 8 is an enlarged cross-sectional view of a representative part of the face substrate, which illustrates the image display device shown in FIG. 7.

FIG. 6 is an enlarged cross-sectional view showing the constitution of the FED of another embodiment of the image display device according to the invention. In FIG. 6, the constitution which makes this embodiment different from the embodiment shown in FIG. 5 lies in the fact that, on the whole surface of the back surface of the anode ADE, which is formed on the inner surface of the face substrate SUB2 and faces the control electrodes G in an opposed manner, as a halation prevention film, an aluminum film ALP, which hardly emits the secondary electrons and has a film thickness to an extent that the secondary electrons can hardly pass through the anode ADE, is applied by a sputtering method, for example.

Here, the formation of the aluminum film ALP is not limited to a sputtering method, and the aluminum film ALP may be formed with a film thickness of approximately 1000 angstrom to approximately 10000 angstrom using a resistance vapor deposition method or an electron beam vapor deposition method. When the anode voltage Eb is approximately 13 kV, the aluminum film ALP, having a film thickness of less than approximately 1000 angstrom, exhibits the small secondary electron cutting or reducing effect, and, hence, it is desirable that the film thickness is not less than approximately 2000 angstrom. On the other hand, when the film thickness exceeds approximately 10000 angstrom, the beam transmissivity is lowered, thus leading to an insufficient brightness. At the same time, there arises a phenomenon in which Al is peeled off from the phosphor film due to an emission of gas from a background phosphor film on which the Al film is formed (for example, gas which is generated when resin, a filming film or the like is decomposed), and, hence, it is desirable that the film thickness is not greater than approximately 7000 angstrom, so as to take a non-defective product ratio during the manufacturing steps into consideration.

In such a constitution, by forming the aluminum film ALP on the back surface of the anode ADE, a low cut filter is formed, which prevents low energy secondary electrons from passing through the anode ADE. Accordingly, among the trace amount of secondary electrons e2 which are emitted from the anode ADE, the low energy secondary electrons hardly reenter the anode ADE, and, hence, the emission of light of phosphors PHS attributed to the reentry of the low energy electrons can be reduced, whereby halation which is generated in the peripheral portion of the bright display image can be prevented.

In the description of the above-mentioned embodiments, an explanation has been given with respect to a case in which the invention is applied to an FED which includes a face substrate having phosphors and a black matrix on the inner surface and having the anode on the back surface of the phosphors and the black matrix. However, it is needless to say that the invention is not limited to such a case, and that exactly the same advantageous effects can be attained even when the invention is applied to an FED which includes face substrate having the anode on the inner surface thereon and having the phosphors and the black matrix on the back surface of the anode.

Further, in the description of the above-mentioned embodiments, an explanation has been given with respect to a case in which the invention is applied to a FED (field emission display) panel. However, it is needless to say that the invention is not limited to such a case, and, that exactly the same advantageous effects can be attained even when the invention is applied to a display or an image receiving set which uses an FED (field emission display) panel.

Further, in the description of the above-mentioned embodiments, an explanation has been given with respect to a case in which the invention is applied to an FED which uses CNT (carbon nanotubes) as the electron sources. However, it is needless to say that the invention is not limited to such a case, and that exactly the same advantageous effects can be attained even when the invention is applied to FED which uses electron sources made of MIM (metal-insulator-metal).

What is claimed is:

1. An image display device comprising:
    a face substrate which has phosphors, a black matrix and an anode on an inner surface thereof;
    a back substrate which has a plurality of electron sources on an inner surface thereof and is arranged to face the face substrate in an opposed manner with a given distance therebetween; and
    a frame body which is interposed between the face substrate and the back substrate in a state that the frame body surrounds a display region and holds the given distance;
    wherein a voltage of approximately 13±3 kV is applied to the anode; and
    wherein a secondary electron suppressing film which attenuates the reentry of secondary electrons which are generated when electron beams impinge on the anode is formed on a back surface of the anode.

2. An image display device comprising:
    a face substrate which has phosphors, a black matrix and an anode on an inner surface thereof;
    a back substrate which has a plurality of electron sources on an inner surface thereof and is arranged to face the face substrate in an opposed manner with a given distance therebetween;
    a frame body which is interposed between the face substrate and the back substrate in a state that the frame body surrounds a display region and holds the given distance, and
    distance holding members which are sandwiched in an erected manner between the face substrate and the back substrate and holds a distance between the face substrate and the back substrate to a given distance;
    wherein a voltage of approximately 13±3 kV is applied to the anode; and
    wherein a secondary electron suppressing film which attenuates the reentry of secondary electrons which are generated when electron beams impinge on the anode is formed on a back surface of the anode and at positions which avoid the distance holding members.

3. An image display device according to claim 1, wherein the secondary electron suppressing film is formed of a discontinuous film.

4. An image display device according to claim 1, wherein the secondary electron suppressing film is formed of a carbon film having at least one layer.

5. An image display device according to claim 1, wherein the secondary electron suppressing film is formed of a stacked film which is constituted of a carbon film and a graphite film.

6. An image display device according to claim 1, wherein the secondary electron suppressing film is formed of a boron film having at least one layer.

7. An image display device according to claim 1, wherein the secondary electron suppressing film is formed of a stacked film which is constituted of a boron film and a graphite film.

8. An image display device according to claim 2, wherein the secondary electron suppressing film is formed of a discontinuous film.

9. An image display device according to claim 2, wherein the secondary electron suppressing film is formed of a carbon film having at least one layer.

10. An image display device according to claim 2, wherein the secondary electron suppressing film is formed of a stacked film which is constituted of a carbon film and a graphite film.

11. An image display device according to claim 2, wherein the secondary electron suppressing film is formed of a boron film having at least one layer.

12. An image display device according to claim 2, wherein the secondary electron suppressing film is formed of a stacked film which is constituted of a boron film and a graphite film.

* * * * *